United States Patent
Kamiyama

(10) Patent No.: US 6,172,953 B1
(45) Date of Patent: Jan. 9, 2001

(54) DEFECT DETECTOR AND INFORMATION REPRODUCTION APPARATUS EMPLOYING THE SAME

(75) Inventor: Hideyo Kamiyama, Tokorozawa (JP)

(73) Assignee: Pioneer Electronic Corporation, Tokyo (JP)

( * ) Notice: Under 35 U.S.C. 154(b), the term of this patent shall be extended for 0 days.

(21) Appl. No.: 09/192,330

(22) Filed: Nov. 16, 1998

(30) Foreign Application Priority Data

Nov. 19, 1997 (JP) .............................................. P09-317856

(51) Int. Cl.$^7$ ...................................................... G11B 7/00
(52) U.S. Cl. ................... 369/54; 369/44.41; 369/124.15
(58) Field of Search ................................ 369/54, 58, 47, 369/48, 124.15, 44.41, 44.27, 44.28

(56) References Cited

U.S. PATENT DOCUMENTS 5,978,333 * 11/1999 Kobayashi et al. ............... 369/44.41

* cited by examiner

Primary Examiner—Nabil Hindi
(74) Attorney, Agent, or Firm—Nixon & Vanderhye

(57) ABSTRACT

The upper envelop signal generating unit detects the upper envelop of the detection signal to generate the upper envelop signal corresponding to the detected upper envelop, and the lower envelop signal generating unit detects the lower envelop of the detection signal to generate the lower envelop signal corresponding to the detected lower envelop. The slice signal generating unit divides the voltage difference of the upper envelop signal and the lower envelop signal using a predetermined division ratio to generate the slice signal. The averaging unit averages the slice signal to produce the average signal. The defect detecting unit compares the average signal and the upper envelop signal to produce the defect detection signal indicating the period in which the voltage of the upper envelop signal is lower than the voltage of the average signal. As a result, a very short defect like a wedge-shape defect can be reliably detected.

6 Claims, 3 Drawing Sheets

FIG.3A  Srf:  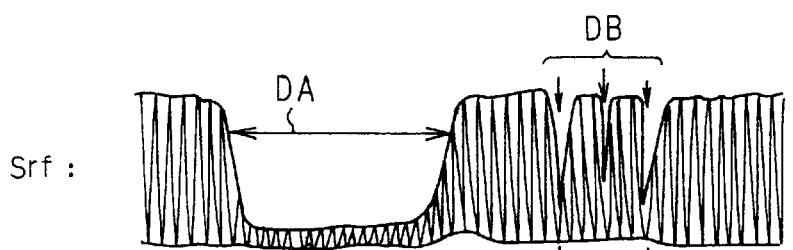
FIG.3B  Shrf:  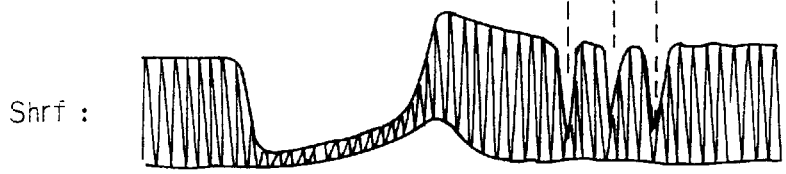
FIG.3C  Sphℓ,Sphs  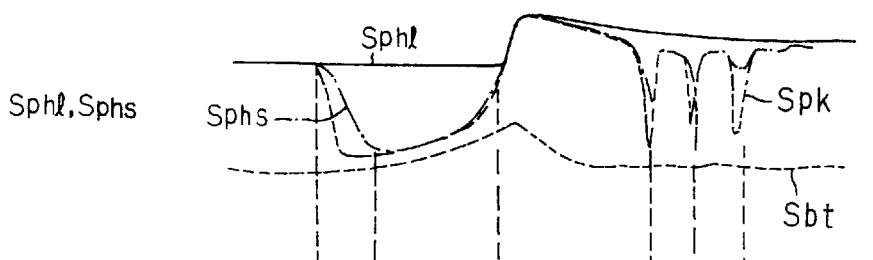
FIG.3D  Sds  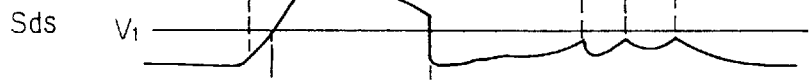
FIG.3E  Sdfd  
FIG.3F  Sph,Sbh Sℓp,Sff  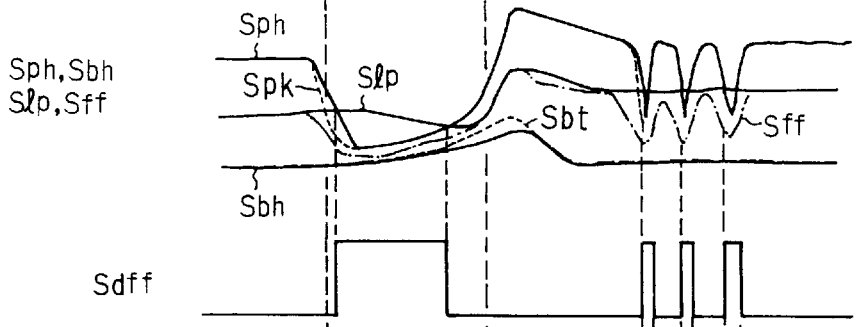
FIG.3G  Sdff  
FIG.3H  Sdf  

DEFECT DETECTOR AND INFORMATION REPRODUCTION APPARATUS EMPLOYING THE SAME

BACKGROUND OF THE INVENTION

1. Field of the Invention

The present invention relates to a defect detector for detecting defects included in a detection signal of information recorded on a storage medium, and more specifically to a defect detector which detects defects in the detection signal having a lower level than a predetermined level that enables the detection signal to function as a correct detection signal.

2. Description of the Prior Art

There are broadly known information reproduction apparatuses, such as a Compact Disc player, which reproduces information recorded on a storage medium by irradiating a light beam such as a laser beam thereon and receiving the reflected light beam to obtain recorded information. In reproduction from the above optical disc, if defects such as scratches, stains or the like exist on the optical disc, the detection signal obtained from such portions of the optical disc may frequently include defects (i.e., inappropriate portion) in the detection signal (hereinafter simply referred to as "defect"). The defect generally includes two types, i.e., a relatively long defect and a relatively short defect. The long defect has the detection signal level lower than a predetermined level and lasting relatively long period of time. The short defect results from stains, fingerprints and the like on the optical disc and lasts relatively short period of time (e.g. observed as a wedge-shape in the detection signal waveform).

A defect detecting method employed on a conventional information reproduction apparatus operates in the following manner. First, an upper envelop of the detection signal is separately held by a peak-holding circuit of a long time constant and a peak-holding circuit of a short time constant. Then, the output signal of the peak-holding circuit of a short time constant is subtracted from the output signal of the peal-holding circuit of a long time constant, and the resultant signal is compared with a preset threshold level for the defect detection. If the resultant signal is lower than the preset threshold, it is judged that the defects exist.

By the above mentioned method, the relatively long defect can be readily detected because the time period in which the output signals of the peak-holding circuits of two types differ from each other is long. However, in the case of relatively short defect, the output signals of the peak-holding circuits differ only for a short period of time and the difference itself is small, and hence it is difficult to reliably detect such a short defect, especially a wedge-shaped defect. If the threshold is set at a lower level to overcome the above-mentioned problem, correct portions of the detection signal may be erroneously judged as defects and the defect compensation operation may be performed even if actually it is not the defect, thereby disturbing correct information reproduction.

SUMMARY OF THE INVENTION

It is an object of the present invention to provide a defect detector capable of reliably detecting not only long defects but also short defects like the ones of wedge-shape.

According to one aspect of the present invention, there is provided a defect detector for detecting a defect in a detection signal obtained by detecting information, the defect having a level lower than a predetermined level of the detection signal, the detector including: an upper envelop signal generating unit for detecting an upper envelop of the detection signal to generate an upper envelop signal corresponding to the detected upper envelop; a lower envelop signal generating unit for detecting a lower envelop of the detection signal to generate a lower envelop signal corresponding to the detected lower envelop; a slice signal generating unit for dividing a voltage difference of the upper envelop signal and the lower envelop signal using a predetermined division ratio to generate a slice signal; an averaging unit for averaging the slice signal to produce an average signal; and a defect detecting unit for comparing the average signal and the upper envelop signal to produce a defect detection signal indicating the period in which the voltage of the upper envelop signal is lower than the voltage of the average signal.

In accordance with the defect detector thus configured, the upper envelop signal generating unit detects the upper envelop of the detection signal to generate the upper envelop signal corresponding to the detected upper envelop, and the lower envelop signal generating unit detects the lower envelop of the detection signal to generate the lower envelop signal corresponding to the detected lower envelop. The slice signal generating unit divides the voltage difference of the upper envelop signal and the lower envelop signal using a predetermined division ratio to generate the slice signal. The averaging unit averages the slice signal to produce the average signal. The defect detecting unit compares the average signal and the upper envelop signal to produce the defect detection signal indicating the period in which the voltage of the upper envelop signal is lower than the voltage of the average signal. As a result, a very short defect like a wedge-shape defect can be reliably detected.

Preferably, the averaging unit uses a first time constant in averaging and the upper envelop signal generating unit uses a second time constant in generating the upper envelop signal, wherein the first time constant is larger than the second time constant. By this, the defect detection becomes more reliable. In a preferred embodiment, the slice signal generating unit divides the voltage difference at a division ratio of 1:1.

According to another aspect of the present invention, there is provided a defect detector for detecting a defect in a detection signal obtained by detecting information, the defect having a level lower than a predetermined threshold level of the detection signal, the detector including: an first upper envelop signal generating unit for detecting an upper envelop of the detection signal using a first time constant to generate an upper envelop signal corresponding to the detected upper envelop; a lower envelop signal generating unit for detecting a lower envelop of the detection signal to generate a lower envelop signal corresponding to the detected lower envelop; a slice signal generating unit for dividing a voltage difference of the upper envelop signal and the lower envelop signal using a predetermined division ratio to generate a slice signal; an averaging unit for averaging the slice signal to produce an average signal; a first detecting unit for comparing the average signal and the upper envelop signal to produce a first detection signal indicating the period in which the voltage of the upper envelop signal is lower than the voltage of the average signal; a second upper envelop signal generating unit for detecting an upper envelop of the detection signal using a second time constant to generate a second upper envelop signal corresponding to the detected upper envelop, the second time constant being larger than the first time constant; a third upper envelop signal generating unit for detecting an upper envelop of the detection signal using a third time constant to generate a third upper envelop signal corresponding to the detected upper envelop, the third time constant being larger than the second time constant; a difference signal generating unit for generating a difference signal indicating a voltage difference between the second upper envelop signal and the third upper envelop signal; a second detection unit for comparing the difference signal with the predetermined threshold level to produce a second detection signal indicating the period in which the difference signal is larger than the threshold value; and a defect detecting unit for adding the first detection signal and the second detection signal to produce the defect detection signal.

In accordance with the defect detector thus configured, the first upper envelop signal generating unit detects the upper envelop of the detection signal using the first time constant to generate an upper envelop signal corresponding to the detected upper envelop, and the lower envelop signal generating unit detects the lower envelop of the detection signal to generate the lower envelop signal corresponding to the detected lower envelop. The slice signal generating unit divides the voltage difference of the upper envelop signal and the lower envelop signal using the predetermined division ratio to generate the slice signal. The averaging unit averages the slice signal to produce the average signal, and the first detecting unit compares the average signal and the upper envelop signal to produce the first detection signal indicating the period in which the voltage of the upper envelop signal is lower than the voltage of the average signal. Further, the second upper envelop signal generating unit detects the upper envelop of the detection signal using the second time constant to generate the second upper envelop signal corresponding to the detected upper envelop, wherein the second time constant is larger than the first time constant. The third upper envelop signal generating unit detects the upper envelop of the detection signal using the third time constant to generate a third upper envelop signal corresponding to the detected upper envelop, wherein the third time constant is larger than the second time constant. The difference signal generating unit generates the difference signal indicating the voltage difference between the second upper envelop signal and the third upper envelop signal, and the second detection unit compares the difference signal with the predetermined threshold level to produce the second detection signal indicating the period in which the difference signal is larger than the threshold value. Then, the defect detecting unit adds the first detection signal and the second detection signal to produce the defect detection signal. As a result, both the long defect and short defect may be reliably detected.

In a preferred embodiment, the slice signal generating unit divides the voltage difference at a division ratio of 1:1.

According to still another aspect of the present invention, there is provided an information reproduction apparatus including: the above described defect detector; an information detecting unit for detecting the detection signal; a compensating unit for compensating the defect based on the defect detection signal; and a reproducing unit for reproducing the information based on the detection signal compensated by the compensating unit. By this, both the defects and short defects may be reliably detected, and correct information may be reproduced by compensating for the defects thus detected.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIGS. 3A to 3H show waveforms of signals produced and processed in the defect detection unit shown in FIG. 2.

DETAILED DESCRIPTION OF THE PREFERRED EMBODIMENTS

The preferred embodiment of the present invention will now be described below with reference to the attached drawings. The embodiment described below is directed to the application of the present invention to an information reproduction apparatus which reproduces information recorded on an optical disc serving as a storage medium.

Figure 1:
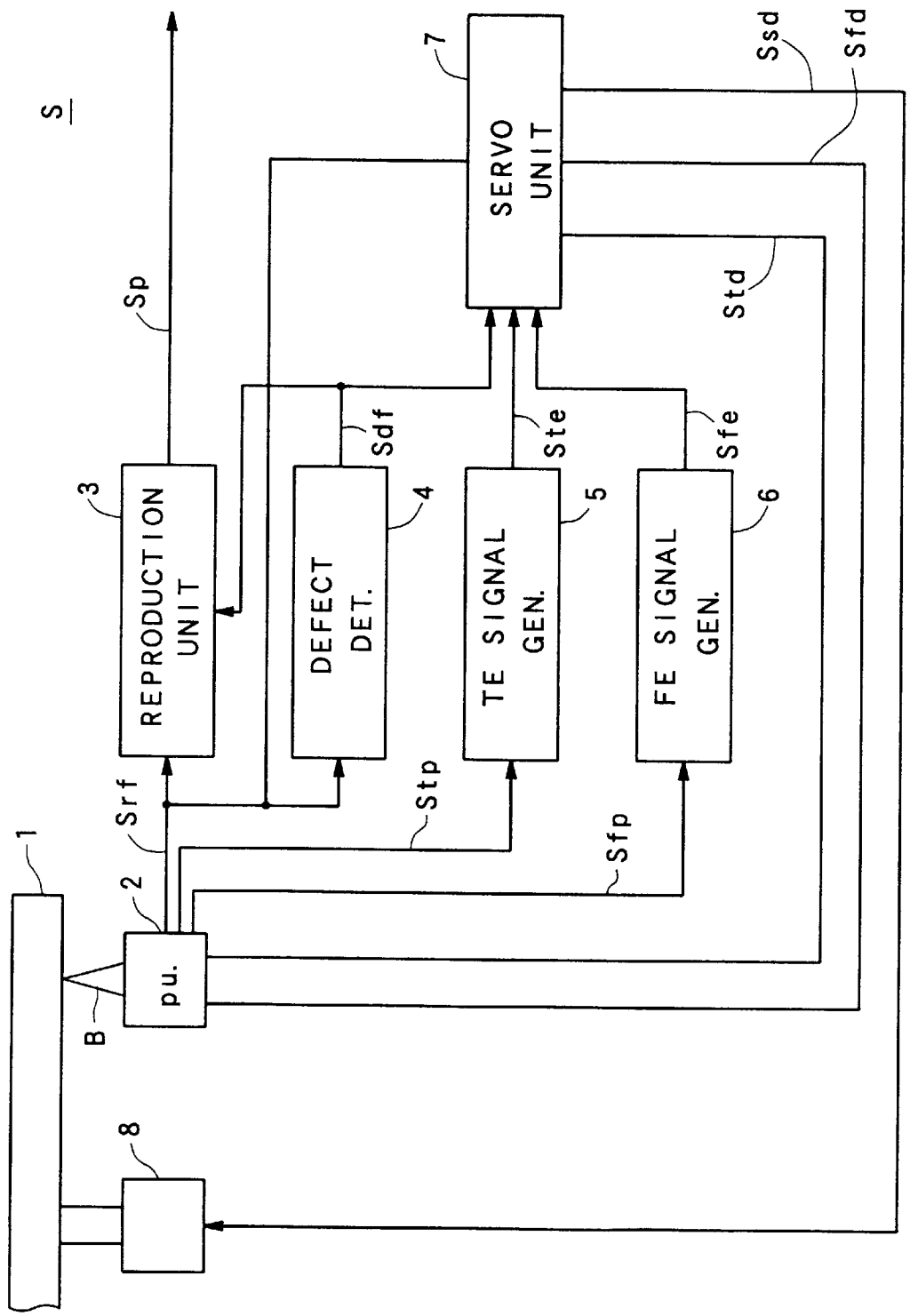
FIG. 1 is a block diagram showing a schematic configuration of an information reproduction apparatus according to an embodiment of the present invention.

First, the description will be given of an overall configuration and operation of the information reproducing apparatus according to an embodiment of the present invention by referring to FIG. 1. As shown in FIG. 1, the information reproducing apparatus S includes an optical disc 1, a pickup 2, a reproduction unit 3, a defect detecting unit 4, a tracking error signal generating unit 5, a focus error signal generating unit 6, a servo unit 7 and a spindle motor 8.

Next, the operation of those components will be described. At the time of reproducing information, the optical disc 1 is rotated at a predetermined rotation speed by the spindle motor 8 which is driven by a spindle control signal Ssd described later. The pickup 2 emits the light beam B such as a laser beam onto the optical disc 1 and receives the reflected light beam to generate a reproduced RF signal Srf corresponding to the information recorded on the optical disc 1. This reproduced RF signal Srf may include defect resulting from the scratches, stains and the like on the surface of the optical disc 1. Simultaneously, based on the reflected light beam, the pickup 2 generates a focus error detection signal Sfp indicating the vertical shift of the focal point of the light beam B from the information recording surface of the optical disc 1, and also generates a tracking error detection signal Stp indicating the shift of the focal point of the light beam B from the tracks on the surface of the optical disc 1 in a tracking direction (i.e., the radial direction of the disc). As appreciated, at the timing when the reproduced RF signal Srf includes the defect, the focus error detection signal Sfp and the tracking error detection signal Stp also include the defect.

The defect detecting unit 4 detects the defects in the reproduced RF signal Srf according to the method described later, and supplies the defect signal Sdf to the reproduction unit 3 and the servo unit 7. The reproduction unit 3 applies a compensation processing such as an error compensation processing onto the defects in the reproduced RF signal Srf and demodulates the reproduced RF signal Srf to output the reproduction signal Sp corresponding to information to be reproduced to an external unit. The tracking error signal generating unit 5 receives the tracking error detection signal Stp and generates the tracking error signal Ste indicating the shift of the light beam B in the tracking direction on the basis of the tracking error detection signal Stp and outputs it to the servo unit 7. Simultaneously, the focus error signal generating unit 6 receives the focus error detection signal Sfp and generates the focus error signal Sfe indicating the shift of the focal point of the light beam B from the information recording surface of the optical disc 1 on the basis of the focus error detection signal Sfp, and outputs it to the servo unit 7.

The servo unit 7 applies the necessary compensation processing, such as holding the previous value over the defect portion of the tracking error signal Ste, on the basis of the defect signal Sdf and the tracking error signal Ste. At the same time, the servo unit 7 also generates the tracking drive signal Std for driving an objective lens (not shown) in the pickup 2 in the tracking direction and supplies it to a tracking actuator (not shown) for transferring the objective lens in the tracking direction. Simultaneously, the servo unit 7 applies the necessary compensation processing, such as holding the previous value over the defect portion of the focus error signal Sfe, on the basis of the defect signal Sdf and the focus error signal Sfe. At the same time, the servo unit 7 also generates the focus drive signal Sfd for driving the objective lens in the pickup 2 in the perpendicular direction with respect to the information recording surface of the optical disc 1, and supplies it to a focus actuator for transferring the objective lens perpendicularly to the optical disc surface. Thus, the tracking actuator and the focus actuator are driven based on the tracking drive signal Std and the focus drive signal Sfd such that the objective lens is moved in the tracking direction and the perpendicular direction to the information recording surface to perform so-called tracking servo control and focus servo control. The servo unit 7 generates the spindle control signal Ssd for driving the spindle motor 8 on the basis of the defect signal Sdf and the reproduced RF signal Srf, and supplies it to the spindle motor 8.

Figure 2:
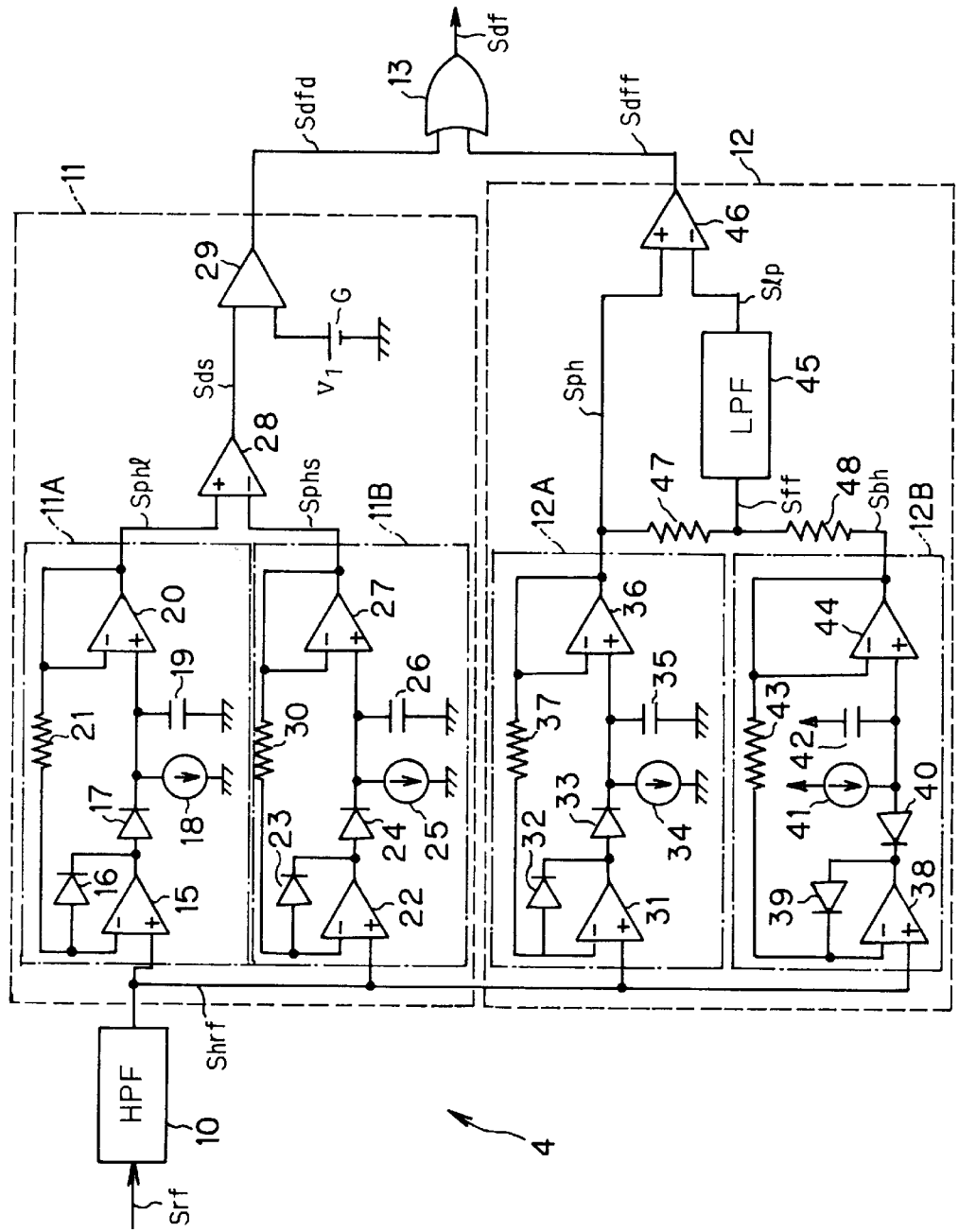
FIG. 2 is a block diagram showing the detailed configuration of the defect detection unit shown in FIG. 1.

Next, the configuration and the operation of the defect detecting unit 4 according to the present invention will be described with reference to FIGS. 2 and 3. As shown in FIG. 2, the defect detecting unit 4 includes a HPF (High Pass Filter) 10, a first defect detecting unit 11, a second defect detecting unit 12, and a logical OR circuit 13. The first defect detecting unit 11 includes an upper envelop detectors 11 A and 11 B, a subtracter 28, a comparator 29 and a threshold voltage generator G. The second defect detector 12 includes an upper envelop detectors 1 2A, an lower envelop detector 1 2B, a LPF (Low Pass Filter) 45 serving as an averaging unit, a subtracter 46, and resistors 47 and 48. The upper envelop detector 1 1A includes operational amplifiers 15 and 20, diodes 16 and 17, a constant current source 18, a capacitor 19, and a resistor 21. The upper envelop detector 11 B includes operational amplifiers 22 and 27, diodes 23 and 24, a constant current source 25, a capacitor 26, and a resistor 30. The upper envelop detector 12A includes operational amplifiers 31 and 36, diodes 32 and 33, a constant current source 34, a capacitor 35, and a resistor 37. The lower envelop detector 12B includes operational amplifiers 38 and 44, diodes 39 and 40, a constant current source 41, a capacitor 42, and a resistor 43.

The relationship of the capacities of the capacitors 19, 26 and 35 are as follows:

Capacitor 19>Capacitor 26>Capacitor 35,
and the ratio of them may be, for example:

Capacitor 19: Capacitor 26: Capacitor 35=10:1:0.1.
The resistance of the resistor 47 is set to be equal to the resistance of the resistor 48. The upper envelop detectors 11A, 11B and 12A are designed to detect the upper envelop of the High-Pass signal Shrf, and the lower envelop detector 12B is designed to detect the lower envelop of the High-Pass signal Shrf. Since the configuration of the detectors 11A, 11B, 12A and 12B are known in the art, the detailed description will be omitted.

Next, the operation will be described below. It is now assumed that the reproduced RF signal Srf inputted to the defect detecting unit 4 includes the long defect DA and the short, wedge-shaped defects DB, as shown in FIG. 3A, according to the size of the scratch, stain and the like on the optical disc 1. The HPF 10 eliminates the DC component of the reproduced RF signal Srf to produce the High-Pass signal Shrf shown in FIG. 3B, and supplies it to the upper envelop detectors 11A, 11B and 12A and the lower envelop detector 12B. Clearly, the High-Pass signal Shrf includes the portions of the defects DA and DB.

The operation of the first defect detecting unit 11 will be described. The upper envelop detector 11 A in the first defect detecting unit 11 detects the upper envelop of the High-Pass signal Shrf by a known technique, and generates the envelop signal Sphl of the solid line in FIG. 3C. Here, the upper envelop of the HighPass signal Shrf is an envelop based on the reflected light from the portion of the optical disc 1 that increases the light quantity of the reflected light. Simultaneously, the upper envelop detector 11B in the first defect detecting unit 11 detects the upper envelop of the High-Pass signal Shrf by a known technique, independently of the upper envelop detector 11A, and generates the envelop signal Sphs shown as the dotted line in FIG. 3C. It is noted that FIG. 3C shows, as the dotted lines Spk and Sbt, the waveforms of the peak value and the bottom value of the High-Pass signal Shrf. Since the relationship:

Capacitor 19 >Capacitor 26 stands, the envelop signal Sphl is a signal which is obtained by detecting the upper envelop of the High-Pass signal Shrf using a longer time constant, whereas the envelop signal Sphs is a signal which is obtained by detecting the upper envelop of the High-Pass signal using a shorter time constant. The subtracter 28 subtracts the envelop signal Sphs from the envelop signal Sphl to generate the subtraction signal Sds shown in FIG. 3D. As seen, the subtraction signal Sds includes non-zero waveform at the respective timings of the defects. Then, the comparator 29 compares the subtraction signal Sds with the preset threshold voltage $V_1$ which is determined for the defect detection and is generated by the threshold voltage generator G, and generates the defect detection signal Sdfd which takes the HIGH level during the time period when the subtraction signal Sds is higher than the threshold voltage $V_1$. Here, in order to avoid such an erroneous detection that the non-defect portion of the signal which is not actually the defect is detected as the defect, the threshold voltage $V_1$ needs to be sufficiently high voltage as seen in FIG. 3D. As a result, the defect detection signal Sdfd includes the pulse corresponding to the long defect DA, but does not include the pulses corresponding to the short defects DB.

Next, the operation of the second defect detecting unit 12 will be described below. The upper envelop detector 12A in the second defect detecting unit 12 detects the upper envelop of the inputted High-Pass signal Shrf by a known method to generate the envelop signal Sph shown as the solid line in FIG. 3F, and outputs it to the resistor 47 and the subtracter 46. Simultaneously, the lower envelop detector 12B in the second defect detecting unit 12 detects the lower envelop of the inputted High-Pass signal Shrf by a known method to generate the envelop signal Sbh shown as the solid line in FIG. 3F, and outputs it to the resistor 48. The lower envelop of the High-Pass signal Shrf is an envelop in the High-Pass signal Shrf which is based on the reflected light from the portion on the optical disc 1 where the light quantity of the reflected light is small. Namely, the higher the level of the High-Pass signal Shrf is, the more the reflected light quantity from the optical disc 1 is. FIG. 3F shows the waveforms Spk and Sbt of the peak values and the bottom values of the High-Pass signal Shrf, similarly to FIG. 3C. Since the following relationship holds as mentioned above:

Capacitor 26 >Capacitor 35, the envelop signal Sph is a signal which is obtained by detecting the upper envelope of the High-Pass signal Shrf using a shortest time constant and has a waveform most analogous to the upper envelope of the High-Pass signal Shrf.

The resistors 47 and 48 divide the voltage difference between the envelop signal Sph and the envelop signal Sbh at 1:1 ratio, and outputs a slice signal Sff which constantly has the voltage value at midpoint of the voltage values of the envelop signals Sph and Sbh from the connection point of the resistors 47 and 48. The slice signal Sff is shown as the dotted line in FIG. 3F. The LPF 45 averages the slice signal Sff using a time constant longer than that used in the generation of the envelop signal Sph to generate the averaged signal Slp shown as the solid line in FIG. 3F. As seen in FIG. 3F, the averaged signal Slp thus generated has the voltage value that traverses and crosses the respective defects in the High-Pass signal Shrf (i.e., the voltage value higher than that of the bottoms of the defects DA and DB). The subtracter 46 subtracts the averaged signal Sip from the envelop signal Sph to output the defect detection signal Sdff shown in FIG. 3G. As discussed above, the envelop signal Sph is obtained by detecting the upper envelope of the High-Pass signal Shrf using the shortest time constant and the averaged signal Slp has the voltage traversing the respective defect portions in the High-Pass signal Shrf. Therefore, in the defect detection signal Sdff, while the pulse corresponding to the long defect DA becomes shorter than the actual time length of the defect DA, the pulses corresponding to the short defects DB exist at the timings precisely corresponding to those defects DB. Thereafter, the OR circuit 13 operates the logical sum of the defect detection signal Sdfd and the defect detection signal Sdff to generate the defect signal Sdf indicating the defects in the reproduced RF signal Srf. As shown in FIG. 3H, the defect signal Sdf thus generated includes both the pulse having the pulse width corresponding to the time length of the long defect DA and the pulses having the pulse widths corresponding to the time length of the short, wedge-shaped defects DB. Therefore, by performing necessary compensation processing of the defects in the reproduction unit 3 and/or in the servo unit 7 based on the defect signal Sdf, the defect detection may be correctly compensated for.

As described above, according to the operation of the information reproduction apparatus S of the present invention, the average of the slice signal Sff having the voltage equally divided the voltage difference of the envelop signals Sph and Sbh is compared with the envelops signal Sph to detect the defects, thereby enabling reliable defect detection of even the short, wedge-shaped defects. In addition, since the time constant used to average the slice signal Sff is longer than that used in the generation of the envelop signal Sph, the averaged signal Slp can assist the accurate defect detection. Further, since the defect signal Sdf is generated by logically adding the defect detection signal Sdfd generated based on the difference of the envelop signals Sphl and Sphs to the defect detection signal Sdff, the use of the defect signal Sdf ensures the correct detection of both the long and short defects, thereby ensuring the correct reproduction of the recorded information.

In the above-described embodiment, while the voltage difference between the envelop signals Sph and Sbh is equally divided to produce the slice signal Sff, the application of the present invention is not limited to this feature. Namely, the division ratio (i.e., the relationship of the resistance of the resistors 47 and 48) may be appropriately determined and altered in consideration of the sensitivity of the defect detection required in the design of the information reproduction apparatus S. For example, in order to further improve the defect detection sensitivity, the division ratio may be determined such that the slice signal Sff has higher voltage (i.e., closer to the upper envelop signal Sph). Still further, while the above described embodiment is directed to the application of the present invention to the information reproduction apparatus S which reproduces the information from the optical disc 1, the present invention is applicable to the defect detection in magnetically reproducing recorded information from tape-shaped magnetic storage medium.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 09-317856 filed on Nov. 19, 1997 including the specification, claims, drawings and summary is incorporated herein by reference in its entirety.

What is claimed is:

1. A defect detector for detecting a defect in a detection signal obtained by detecting information, the defect having a level lower than a predetermined level of the detection signal, the detector comprising:

an upper envelop signal generating unit for detecting an upper envelop of the detection signal to generate an upper envelop signal corresponding to the detected upper envelop;

a lower envelop signal generating unit for detecting a lower envelop of the detection signal to generate a lower envelop signal corresponding to the detected lower envelop;

a slice signal generating unit for dividing a voltage difference of the upper envelop signal and the lower envelop signal using a predetermined division ratio to generate a slice signal;

an averaging unit for averaging the slice signal to produce an average signal; and a defect detecting unit for comparing the average signal and the upper envelop signal to produce a defect detection signal indicating the period in which the voltage of the upper envelop signal is lower than the voltage of the average signal.

2. A defect detector according to claim 1, wherein the averaging unit uses a first time constant in averaging and the upper envelop signal generating unit uses a second time constant in generating the upper envelop signal, the first time constant being larger than the second time constant.

3. A defect detector according to claim 1, wherein the slice signal generating unit divides the voltage difference at a division ratio of 1:1.

4. A defect detector for detecting effect in a detection signal obtained by detecting information, the defect having a level lower than a predetermined threshold level of the detection signal, the detector comprising:

an first upper envelop signal generating unit for detecting an upper envelop of the detection signal using a first time constant to generate an upper envelop signal corresponding to the detected upper envelop;

a lower envelop signal generating unit for detecting a lower envelop of the detection signal to generate a lower envelop signal corresponding to the detected lower envelop;

a slice signal generating unit for dividing a voltage difference of the upper envelop signal and the lower envelop signal using a predetermined division ratio to generate a slice signal;

an averaging unit for averaging the slice signal to produce an average signal;

a first detecting unit for comparing the average signal and the upper envelop signal to produce a first detection signal indicating the period in which the voltage of the upper envelop signal is lower than the voltage of the average signal;

a second upper envelop signal generating unit for detecting an upper envelop of the detection signal using a second time constant to generate a second upper envelop signal corresponding to the detected upper envelop, the second time constant being larger than the first time constant;

a third upper envelop signal generating unit for detecting an upper envelop of the detection signal using a third time constant to generate a third upper envelop signal corresponding to the detected upper envelop, the third time constant being larger than the second time constant;

a difference signal generating unit for generating a difference signal indicating a voltage difference between the second upper envelop signal and the third upper envelop signal;

a second detection unit for comparing the difference signal with the predetermined threshold level to produce a second detection signal indicating the period in which the difference signal is larger than the threshold value; and a defect detecting unit for adding the first detection signal and the second detection signal to produce the defect detection signal.

5. A defect detector according to claim 4, wherein the slice signal generating unit divides the voltage difference at a division ratio of 1:1.

6. An information reproduction apparatus comprising:

the defect detector according to claim 4;

an information detecting unit for detecting the detection signal;

a compensating unit for compensating the defect based on the defect detection signal; and a reproducing unit for reproducing the information based on the detection signal compensated by the compensating unit.

* * * * *